(12) United States Patent
Zhou et al.

(10) Patent No.: US 11,005,131 B2
(45) Date of Patent: May 11, 2021

(54) BATTERY BOX

(71) Applicant: CONTEMPORARY AMPEREX TECHNOLOGY CO., LIMITED, Ningde (CN)

(72) Inventors: Linggang Zhou, Ningde (CN); Derong Wang, Ningde (CN); Yanhuo Xiang, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 113 days.

(21) Appl. No.: 16/303,425

(22) PCT Filed: Apr. 13, 2017

(86) PCT No.: PCT/CN2017/080440
§ 371 (c)(1),
(2) Date: Jan. 10, 2019

(87) PCT Pub. No.: WO2017/198017
PCT Pub. Date: Nov. 23, 2017

(65) Prior Publication Data
US 2019/0326565 A1    Oct. 24, 2019

(30) Foreign Application Priority Data

May 20, 2016   (CN) .......................... 201610339171.6

(51) Int. Cl.
| | |
|---|---|
| *H01M 2/10* | (2006.01) |
| *H01M 10/613* | (2014.01) |
| *H01M 10/653* | (2014.01) |
| *H01M 50/10* | (2021.01) |
| *H01M 50/20* | (2021.01) |

(52) U.S. Cl.
CPC ......... *H01M 50/10* (2021.01); *H01M 10/613* (2015.04); *H01M 10/653* (2015.04); *H01M 50/20* (2021.01)

(58) Field of Classification Search
CPC ............ H01M 2/1016; H01M 10/613; H01M 10/653; H01M 10/60; H01M 2/1077; H01M 2/02; Y02T 10/7005
See application file for complete search history.

(56) References Cited

U.S. PATENT DOCUMENTS

| | | | |
|---|---|---|---|
| 5,432,017 A | 7/1995 | Hassemer et al. | |
| 5,601,942 A | 2/1997 | Fedele | |
| 9,837,651 B2 | 12/2017 | Huang | |
| 2009/0263705 A1* | 10/2009 | Anantharaman | H01M 2/1077 429/61 |
| 2010/0136413 A1* | 6/2010 | Hermann | H01M 2/1083 429/149 |
| 2014/0154539 A1* | 6/2014 | Kwok | H01M 10/643 429/82 |
| 2014/0362590 A1* | 12/2014 | Chen | H05K 3/284 362/373 |
| 2015/0004461 A1 | 1/2015 | Huang | |
| 2018/0258329 A1* | 9/2018 | Koch | C09J 11/04 |
| 2018/0269438 A1* | 9/2018 | Nishikawa | H01G 11/10 |
| 2019/0020006 A1* | 1/2019 | Motohashi | H01M 2/1077 |

FOREIGN PATENT DOCUMENTS

| | | |
|---|---|---|
| CN | 102447133 A | 5/2012 |
| CN | 202871893 U | 4/2013 |
| CN | 105702892 A | 6/2016 |
| CN | 105720220 A | 6/2016 |
| CN | 105762316 A | 7/2016 |
| CN | 205645963 U | 10/2016 |
| CN | 106299166 A | 1/2017 |
| CN | 205900600 U | 1/2017 |
| CN | 205900709 U | 1/2017 |
| CN | 106450089 A | 2/2017 |
| EP | 0926748 B1 | 8/2001 |
| JP | 10284024 A | 10/1998 |
| JP | 2012009389 A | 1/2012 |
| TW | 201507238 A | 2/2015 |

OTHER PUBLICATIONS

International Search Report dated May 27, 2017 issued in corresponding PCT/CN2017/080440 application (3 pages).
English Abstract of CN 102447133 A published May 9, 2012.
English Abstract of CN 202871893 U published Apr. 10, 2013.
English Abstract of CN 105702892 A published Jun. 22, 2016.
English Abstract of CN 105720220 A published Jun. 29, 2016.
English Abstract of CN 105762316 published Jul. 13, 2016.
English Abstract of CN 205645963 U published Oct. 12, 2016.
English Abstract of CN 106299166 A published Jan. 4, 2017.
English Abstract of CN 205900600 U published Jan. 18, 2017.
English Abstract of CN 205900709 U published Jan. 18, 2017.
English Abstract of CN 106450089 A published Feb. 22, 2017.

(Continued)

*Primary Examiner* — Muhammad S Siddiquee

(74) *Attorney, Agent, or Firm* — Millen, White, Zelano & Branigan, P.C.; William Nixon

(57) ABSTRACT

The present disclosure relates to the technical field of assembly of a battery pack, and particularly, to a battery pack. The battery pack includes a housing. A plurality of cells is arranged in interior of the housing. A structural adhesive is filled between a bottom of the housing and the plurality of cells, and the plurality of cells is adhered to the housing through the structural adhesive. In the battery pack, the cells are arranged in the interior of the housing, and the housing is adhered to the cells through the structural adhesive.

9 Claims, 3 Drawing Sheets

(56) References Cited

OTHER PUBLICATIONS

Supplementary search report in corresponding EP17798581.9 dated Feb. 17, 2020 (pp. 1-7).
Search Report in corresponding CN application 20160339171.6 issue date not listed (pp. 1-14).

* cited by examiner

BATTERY BOX

CROSS-REFERENCE TO RELATED APPLICATIONS

The present application is based on International Application No. PCT/CN2017/080440 filed Apr. 13, 2017, which claims priority to Chinese Patent Application No. 201610339171.6, filed on May 20, 2016, the contents of which are incorporated herein by reference in its entirety.

TECHNICAL FIELD

The present disclosure relates to the field of packing technologies for battery pack and, and in particular, relates to a battery pack.

BACKGROUND

In order to achieve the purpose of heat dissipation for batteries, the existing heat dissipation structure of a battery pack generally adopts a structure in which metal is in contact with a thermal pad or adopts a liquid conduction structure. Modules are provided in the interior of the battery pack, and each module has a frame structure separated from the heat dissipation assembly. Cells are mounted in the module, and adjacent cells are fixed by adhesion.

In the existing battery pack, the cells shall be first adhered with each other, and then mounted in a frame structure of modules in the interior of the battery pack. Since the cells need to be first assembled with the module, the number of components of the battery pack is increased, resulting in a complicated manufacture process and thus a high cost.

SUMMARY

The present disclosure provides a battery pack, aiming to omit the frame structure of the module by adopting a structural adhesive, so as to reduce the number of the components in the battery pack, thereby simplifying manufacture process and reducing manufacturing cost.

The present disclosure provides a battery pack, which includes a housing. A plurality of cells are arranged in interior of the housing. A structural adhesive is filled between a bottom of the housing and the plurality of cells. The plurality of cells are adhered to the housing through the structural adhesive.

In an embodiment, another structural adhesive is filled between adjacent cells of the plurality of cells, and the adjacent cells are adhered to each other by the another structural adhesive. The structural adhesive between the bottom of the housing and the plurality of cells and the another structural adhesive between the adjacent cells of the plurality of cells are in an integrated structure.

In an embodiment, the battery pack further includes a cell fixing board connected to the housing. The cell fixing board is pressed onto the plurality of cells, and the plurality of cells are located between the housing and the cell fixing board.

In an embodiment, the battery pack further includes a mounting bolt screwed with the housing by penetrating through the cell fixing board and the structural adhesive.

In an embodiment, the cell fixing board has an electrode hole, and an electrode of the cell protrudes out of the electrode hole.

In an embodiment, the structural adhesive is a thermal conductive structural adhesive.

In an embodiment, the thermal conductive structural adhesive is a liquid adhesive.

In an embodiment, the thermal conductive structural adhesive has a height no greater than one-sixth of a height of each of the plurality of cells.

In an embodiment, the battery pack further includes an insulation tray located between the housing and the plurality of cells. The insulation tray has a tray adhesive channel, and the structural adhesive protrudes through the tray adhesive channel to adhere to both the housing and the plurality of cells.

In an embodiment, the insulation tray includes a separating board located adjacent cells of the plurality of cells. The separating board has a separating board adhesive channel, and the structural adhesive protrudes through the separating board adhesive channel to adhere to the adjacent cells at two sides of the separating board adhesive channel.

The technical solutions provided in the present disclosure can bring the following beneficial effects.

In the battery pack provided in the present disclosure, the cells are arranged in the interior of the battery pack, and the battery pack is adhered to the cells through the structural adhesive. Since the structural adhesive can function as fixing the cells, the frame structure of the module can be omitted, such that the number of components in the battery pack can be reduced, thereby simplifying manufacture process, improving assembling efficiency and reducing manufacturing cost. Moreover, since the module is no longer needed, the height of the battery pack can be lowered and the volume energy density ratio can be improved.

It should be understood that the above general description and the following detailed description are only illustrative, rather than being intended to limit the present disclosure.

REFERENCE SIGNS

Figure 1:
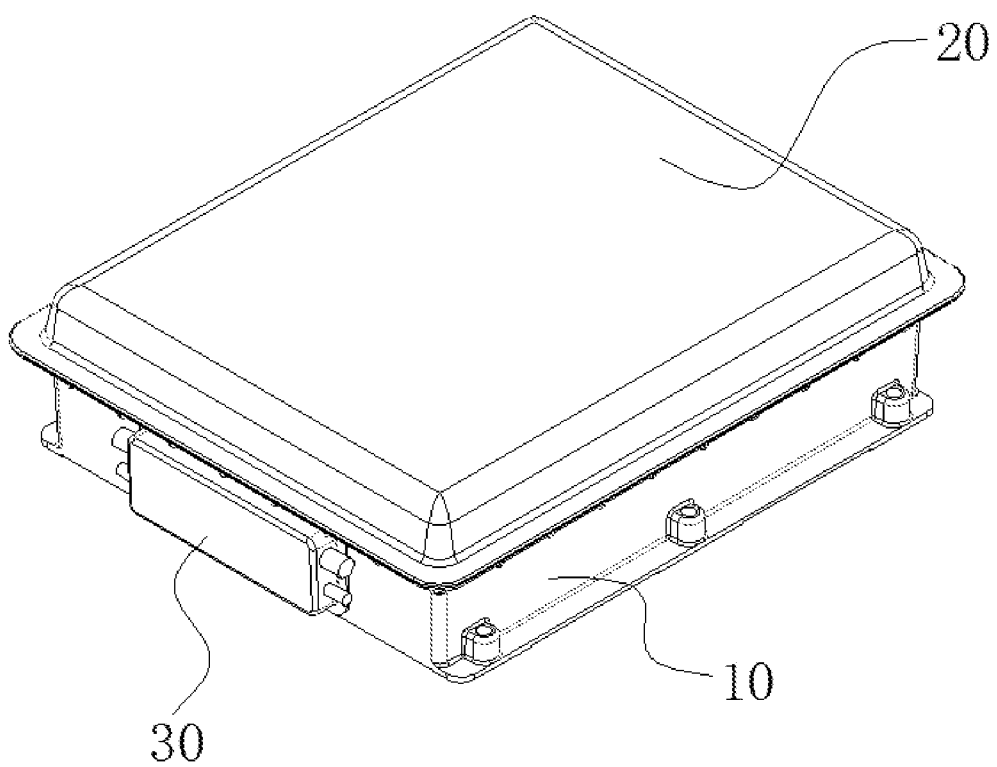
FIG. 1 is a schematic structural view of a battery pack according to an embodiment of the present disclosure.

10—housing;
20—battery pack cover;
30—battery monitoring unit;
40—structural adhesive;
50—sealing ring;
60—cell;
70—mounting bolt;
80—cell fixing board.

The drawings are incorporated into the specification and constitute a part thereof, illustrating embodiments conforming to the present disclosure and used together with the specification to explain the principle of the present disclosure.

DESCRIPTION OF EMBODIMENTS

The present disclosure will be described in further detail by the following embodiments with reference to the drawings. The "front", "rear", "left", "right", "upper", "lower" used in the context are referring to placements of the battery pack and components thereof shown in the drawings.

Embodiments of the present disclosure provide a battery pack, as shown in FIG. 1. The battery pack includes a housing 10 and a battery pack cover 20. The battery pack cover 20 covers the housing 10 to form a sealed accommodating space in the interior thereof. Cells 60 are arranged in the accommodating space, and an electrode terminal of the cell 60 is closer to the battery pack cover 20 than the bottom of the cell. The bottom of the housing 10 is filled with a structural adhesive 40. The battery pack can further include a cell fixing board 80, an insulation tray and a sealing ring 50. For convenience of monitoring a state of the entire battery pack (including monitoring electric quantity, temperature etc.), a battery monitoring unit 30 can also be mounted to the housing 10.

The bottom of the housing 10 has through-holes defined therein along the circumference, as shown in FIG. 1, for mounting of other external components to the battery pack. The housing 10 can be connected to the battery pack cover 20 through bolt connection or clamping connection.

Figure 2:
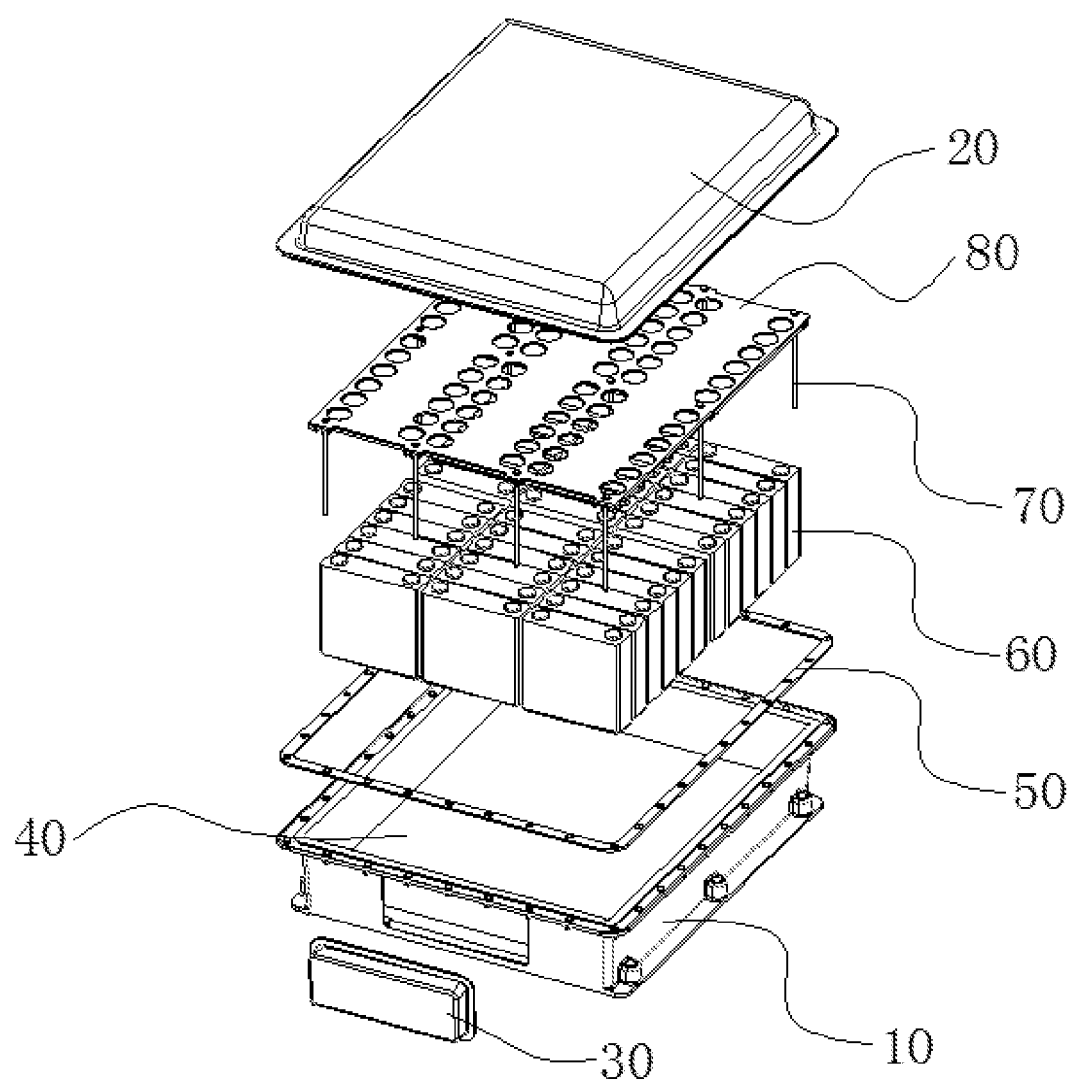
FIG. 2 is an exploded view of a battery pack according to an embodiment of the present disclosure.
Figure 3:
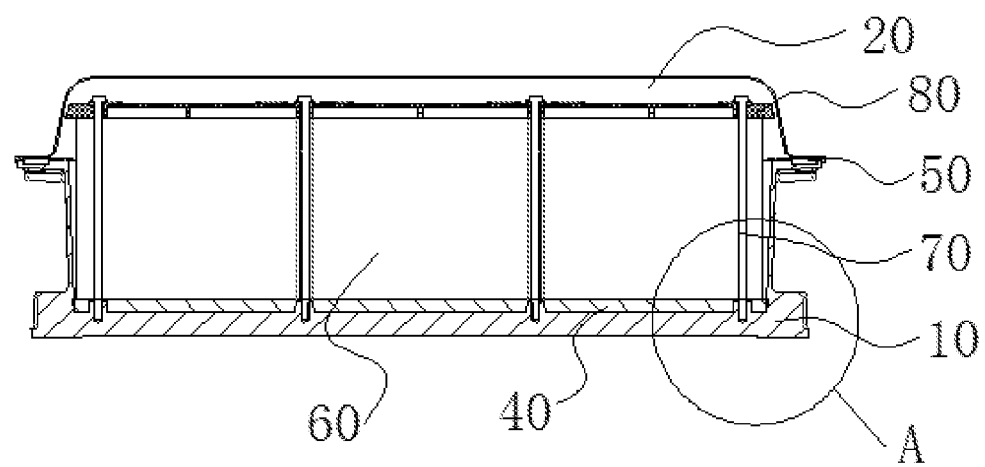
FIG. 3 is a cross-sectional view of a battery pack according to an embodiment of the present disclosure.
Figure 4:
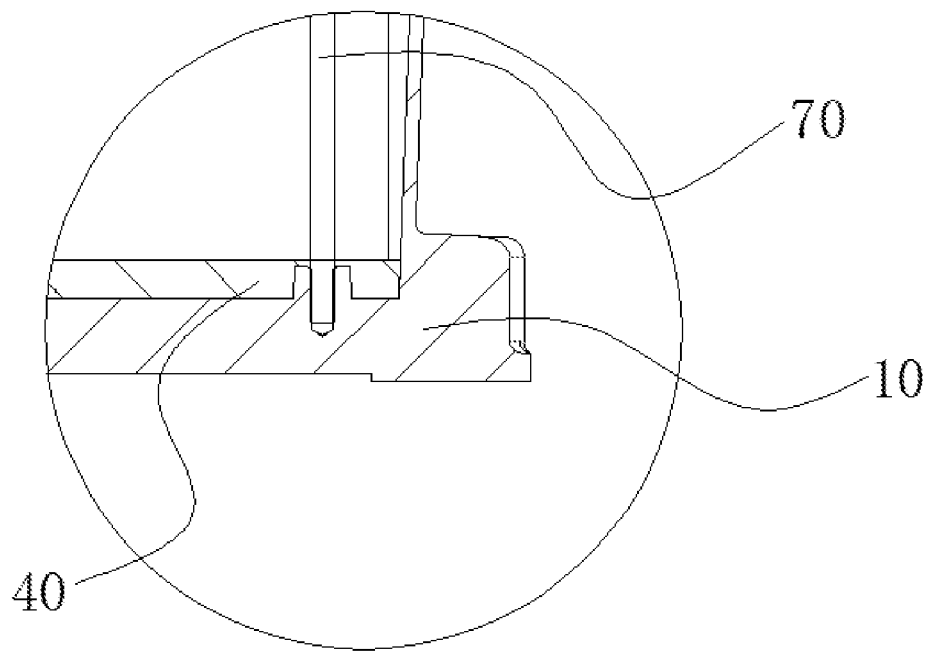
FIG. 4 is a local enlarged view of portion A in FIG. 3.

As shown in FIGS. 2-4, the structural adhesive 40 is used for fixing the cells 60. To be specific, a plurality of cells 60 are arranged in the interior of the housing 10, the structural adhesive 40 is filled between the bottom of the housing 10 and the cells 60, and the cells 60 are adhered to the housing 10 through the structural adhesive 40. The structural adhesive 40 can also be filled between adjacent cells 60, so that side walls of two adjacent cells 60 are adhered by the structural adhesive 40. Moreover, the structural adhesive 40 between the bottom of the housing 10 and the cells 60 and the structural adhesive 40 between adjacent cells 60 can be in an integrated structure, so as to further fix the cells 60.

In the above embodiment, the cells 60 are arranged in the interior of the housing 10, and the housing 10 is adhered to the cells 60 through the structural adhesive 40. Since the structural adhesive 40 functions to fix the cells 60, the frame structure of the module can be omitted, so that the number of components in the battery pack can be reduced, thereby saving manufacture process, improving assembling efficiency, and lowering manufacture cost. In addition, the conventional battery module generally has a height greater than the cell, and thus the height of the battery pack may be increased accordingly. However, in the present disclosure, since no module is needed, the height of the battery pack can be lowered, thereby increasing the volume energy density ratio.

The number of the cells 60 can be determined based on actual requirements, and can be one, two, three, four or more.

The structural adhesive 40 can be a thermal conductive structural adhesive, and also can be a normal adhesive. The structural adhesive 40 can be a solid adhesive or a liquid adhesive. In an embodiment, the above structural adhesive 40 is a thermal conductive structural adhesive. The thermal conductive structural adhesive can achieve both the functions of fixing the cells 60 and thermal conduction. In particular, in the solution in which the structural adhesive 40 is filled between two adjacent cells 60, a larger amount of heat will accumulate at side walls of the cells 60 after the cells 60 are arranged in the housing 10. According to the present disclosure, the side walls of adjacent cells 60 are adhered by the thermal conductive structural adhesive, and the thermal conductive structural adhesive between the side walls of the cells 60 and the thermal conductive structural adhesive for adhering the cells 60 to the housing 10 are in an integrated structure. This can better transfer the heat of the cells 60 to the housing 10 while reducing thermal conductive medium, thereby improving heat dissipation efficiency.

The thermal conductive structural adhesive can be a solid adhesive, and can also be a liquid adhesive, as an example. Due to the fluidity of the liquid adhesive, when the cells 60 are arranged in the housing 10, a tighter contact between the cells 60 and the housing 10 can be achieved, so that the thermal conductive structural adhesive can be distributed more uniform to obtain better thermal conduction effect, thereby achieving the better temperature uniformity of the cells 60 and thus improving service life of the cells 60.

The thermal conductive structural adhesive contains a silica gel, and thus it can both fix the structure and act as a good thermal conductive medium. The thermal conductive structural adhesive can have a height not greater than one-sixth of a height of the cell 60. The height of the thermal conductive structural adhesive can be one-sixth, one-seventh or less of the height of the cell 60, so as to ensure the energy density ratio. The height of the thermal conductive structural adhesive can be greater than one-sixth of the height of the cell 60, for example, one-fourth or more of the height of the cell 60.

The cell fixing board 80 is connected to the housing 10 and located in the interior of the accommodating space, and is used to further fix the cell 60. The cell fixing board 80 is pressed on the cell 60, and the cell 60 is located between the housing 10 and the cell fixing board 80. The cell fixing board 80 can be provided with an electrode hole, and when the cell fixing board 80 is pressed on the cell 60, an electrode of the cell 60 will protrudes out of the electrode hole for further assembling and connection.

The connection between the housing 10 and the cell fixing board 80 can be clamping connection, riveting or bolt connection. As an example, the housing 10 and the cell fixing board 80 can be connected through a mounting bolt 70. That is, the mounting bolt 70 successively penetrates through the cell fixing board 80 and the structural adhesive 40, and then gets into a bolt connection with the housing 10. Penetrating the mounting bolt through the structural adhesive 40 can achieve more reliable fixation of the cell 60.

The sealing ring 50 is used for preventing electrolyte from leaking to the outside of the battery pack and preventing liquid, dust and the like from entering into the battery pack. The sealing ring 50 can be made as a circular ring, or can be made as a sealing strip. The sealing ring 50 is arranged along the circumference of the housing 10 and located between the battery pack cover 20 and the housing 10, and is tightly pressed between the battery pack cover 20 and the housing 10.

The insulation tray is located between the housing 10 and the cells 60, and is provided with a tray adhesive channel. The structural adhesive 40 protrudes through the tray adhesive channel and achieves adhesion to the housing 10 and the cells 60. Such a structure can insulate the cells 60 from the housing 10.

The insulation tray can be provided with a separating board located between adjacent cells. The separating board is provided with a separating board adhesive channel, through which the structural adhesive 40 protrudes to adhere to adjacent cells 60 at two sides thereof. Such a structure can achieve the function of insulating adjacent cells 60.

The insulation tray and the separating board can be in a mesh-shaped structure, in which the tray adhesive channel and the separating board adhesive channel are meshes of the mesh-shaped structure. The insulation tray and the separating board can be in a sponge structure, in which the tray adhesive channel and the separating board adhesive channel are flocculent holes of the sponge structure. The insulation tray and the separating board can be in a flat-plate structure, in which the tray adhesive channel and the separating board adhesive channel are through holes distributed in the flat plate.

In an embodiment of the battery pack without the insulation tray, the following assembling method is adopted.

The first step is to pour a certain amount of structural adhesive 40 into the interior of the housing 10 in such a manner that the structural adhesive 40 is uniformly spread over the bottom of the housing 10. In order to guarantee the volume energy density ratio, the height of the structural adhesive 40 is no greater than one-sixth of the height of the cell 60, for example.

The second step is to, before the structural adhesive 40 is solidified, arrange a certain number of cells 60 in the interior of the housing 10 in such a manner that the structural adhesive 40 is placed between the cells 60 and the housing 10, and that after the structural adhesive 40 is solidified, the cells 60 and the housing 10 are directly adhered through the structural adhesive 40. The cells 60 can be arranged separately in the housing 10, or can be arranged in the housing 10 after being packed.

The third step is to, before the structural adhesive 40 is solidified, tightly press the cell fixing board 80 onto the cells 60, and penetrate the mounting bolt 70 through the cell fixing board 80 and the structural adhesive 40 and then connect it to the bottom of the housing 10, so as to fasten the cell fixing board 80 to the housing 10. Specifically, the mounting bolt 70 is tightly threaded into a corresponding threaded hole of the housing 10 before the structural adhesive 40 is solidified, so that when the structural adhesive 40 is solidified, the mounting bolt 70 is also adhered to the structural adhesive 40. This can achieve the more reliable fixation of the cells 60.

The fourth step is to mount the cell monitoring unit 30 into the housing 10, place the sealing ring 50 on the housing 10, cover the battery pack cover 20 on the housing 10, and tightly press the sealing ring 50 by fastening the battery pack cover 20 with the housing 10.

In an embodiment of the battery pack having the insulation tray, the following assembling method is adopted.

The first step is to place the insulation tray having the separating board in the bottom of the housing 10.

The second step is to arrange a certain number of cells 60 in the interior of the housing 10 in such a manner that the insulation tray is placed between the cells 60 and the housing 10 and the separating board is located between adjacent cells 60. The cells 60 can be arranged separately in the housing 10, or can be arranged in the housing 10 after being packed.

The third step is to tightly press the cell fixing board 80 onto the cells 60.

The fourth step is to pour a certain amount of structural adhesive 40 into the interior of the housing 10 in such a manner that the structural adhesive 40 is uniformly spread over the bottom of the housing 10. In order to guarantee the volume energy density ratio, the height of the structural adhesive 40 is no greater than one-sixth of the height of the cell 60, for example.

The fifth step is to, before the structural adhesive 40 is solidified, penetrate the mounting bolt 70 through the cell fixing board 80 and the structural adhesive 40 and then connect it to the bottom of the housing 10, so as to fasten the cell fixing board 80 to the housing 10. Specifically, the mounting bolt 70 is tightly threaded into a corresponding threaded hole of the housing 10 before the structural adhesive 40 is solidified, so that when the structural adhesive 40 is solidified, the mounting bolt 70 is also adhered to the structural adhesive 40. This can achieve the more reliable fixation of the cells 60.

The sixth step is to mount the cell monitoring unit 30 into the housing 10, place the sealing ring 50 on the housing 10, cover the battery pack cover 20 on the housing 10, and tightly press the sealing ring 50 by fastening the battery pack cover 20 with the housing 10.

The above are some embodiments of the present disclosure, which shall not be interpreted as constituting limitations thereto. For those skilled in the art, the present disclosure can have various modifications and alternations. Any modifications, equivalent substitutions and improvements made within the spirit and principle of the present disclosure shall be regarded as falling into the protection scope of the present disclosure.

What is claimed is:

1. A battery pack, comprising a housing and a battery pack cover, wherein a plurality of cells are arranged in interior of the housing, a structural adhesive is filled between a bottom of the housing and the plurality of cells, the bottom of the housing is opposite to the battery pack cover, and the plurality of cells are adhered to the housing through the structural adhesive,
   wherein the structural adhesive is a thermal conductive structural adhesive for both fixing the plurality of cells and thermal conduction, and the thermal conductive structural adhesive filled between the bottom of the housing and the plurality of cells has a height no greater than one-sixth of a height of each of the plurality of cells.

2. The battery pack according to claim 1, wherein another structural adhesive is filled between adjacent cells of the plurality of cells, and the adjacent cells are adhered to each other by the another structural adhesive; the structural adhesive between the bottom of the housing and the plurality of cells and the another structural adhesive between the adjacent cells of the plurality of cells are in an integrated structure.

3. The battery pack according to claim 1, further comprising a cell fixing board connected to the housing, wherein the cell fixing board is pressed onto the plurality of cells, and the plurality of cells are located between the housing and the cell fixing board.

4. The battery pack according to claim 3, further comprising a mounting bolt screwed with the housing by penetrating through the cell fixing board and the structural adhesive.

5. The battery pack according to claim 3, wherein the cell fixing board has an electrode hole, and an electrode of the cell protrudes out of the electrode hole.

6. The battery pack according to claim 1, wherein the thermal conductive structural adhesive is a liquid adhesive.

7. The battery pack according to claim 1, further comprising an insulation tray located between the housing and the plurality of cells, wherein the insulation tray has a tray adhesive channel, and the structural adhesive protrudes through the tray adhesive channel to adhere to both the housing and the plurality of cells.

8. The battery pack according to claim 7, wherein the insulation tray comprises a separating board located adjacent cells of the plurality of cells, the separating board has a separating board adhesive channel, and the structural adhesive protrudes through the separating board adhesive channel to adhere to the adjacent cells at two sides of the separating board adhesive channel.

9. The battery pack according to claim 7, wherein the insulation tray is configured to insulate the plurality of cells from the housing.

\* \* \* \* \*